Sept. 27, 1955 R. ADLER 2,719,229

BISTABLE SWITCHING CIRCUIT

Filed Dec. 8, 1952

ROBERT ADLER
*INVENTOR.*

BY Francis W. Crotty

HIS ATTORNEY.

United States Patent Office 2,719,229

Patented Sept. 27, 1955

2,719,229

BISTABLE SWITCHING CIRCUIT

Robert Adler, Northfield, Ill., assignor to Zenith Radio Corporation, a corporation of Illinois Application December 8, 1952, Serial No. 324,740

7 Claims. (Cl. 250—27)

This invention relates to bistable switching circuits, such as flip-flop circuits and the like, and more particularly to such circuits employing beam-deflection tubes.

There are numerous uses for bistable switching circuits in the electrical arts, and several types of circuits have been devised to perform a bistable switching function. One of the most conventional arrangements employs a pair of grid-controlled triodes with a cross-coupling including a condenser from the plate of one tube to the grid of the other; application of a control pulse momentarily interrupts space current flow in the normally conductive tube, thus generating a positive pulse which is applied to the grid of the normally non-conductive tube so that when the control pulse is removed, the latter tube is established in a conductive state. The next incoming control pulse restores the circuit to its initial condition.

While conventional triode flip-flop circuits are generally reliable and have achieved widespread acceptance, they have certain inherent disadvantages. In the first place, both of the triode cathodes are continuously heated, although only one cathode is subjected to plate current loading at any one time. This has led to a condition which has been aptly described as a "sleeping sickness," detracting from useful tube life, and is particularly troublesome in the case of multi-tube computers employing numerous flip-flop circuits arranged in cascade-connected binary counting stages. Moreover, cathode failure is the largest single cause of breakdown in multi-tube computers, so that any material reduction in the number of cathodes required in such applications is advantageous from the point of view of overall system reliability.

It is an important object of the present invention to provide a new and improved bistable switching circuit which avoids one or more of the disadvantages inherent in prior art arrangementes of this type.

A more specific object of the invention is to provide a novel bistable switching circuit employing a beam-deflection tube, in which the cathode is subjected to substantially continuous plate current loading so as to avoid the undesirable "sleeping sickness" encountered in the use of double-triode switching circuits.

A further object of the invention is to provide a bistable switching circuit or flip-flop circuit employing but a single electron-emissive cathode per stage.

Still another object of the invention is to provide a new and improved bistable switching circuit of improved reliability while at the same time effecting a material simplification and cost reduction as compared with prior art arrangements.

In accordance with the present invention, a new and improved bistable switching circuit comprises a beam-deflection tube which may be of conventional construction, including a cathode, a pair of electrostatic-deflection electrodes, and a pair of anodes. An intensity-control electrode, which may also constitute a focusing electrode of the electron gun, is interposed between the cathode and the electrostatic-deflection electrode, and the anodes are cross-coupled with the deflectors. The load circuits from the anodes to the cathode each include series-connected resistance and inductance elements, with the sum of the load circuit resistances exceeding the reciprocal of the transconductance of the deflection-control system with respect to the anode system. The intensity-control electrode is normally conditioned to pass beam current. In this condition, beam current is established to one of the two anodes, and, by virtue of the cross-coupling from the anodes to the deflectors, the condition of plate current flow is stabilized. In order to transfer the beam from one anode to the other, an input circuit is coupled to the intensity-control electrode and to the cathode, and the beam is momentarily interrupted in response to negative-polarity control pulses applied to the input circuit. Suitable utilization means is coupled to at least one of the load circuits.

The features of the present invention which are believed to be novel are set forth with particularity in the appended claims. The invention, together with further objects and advantages thereof, may best be understood, however, by reference to the following description taken in connection with the accompanying drawing, in which:

Figure 1:
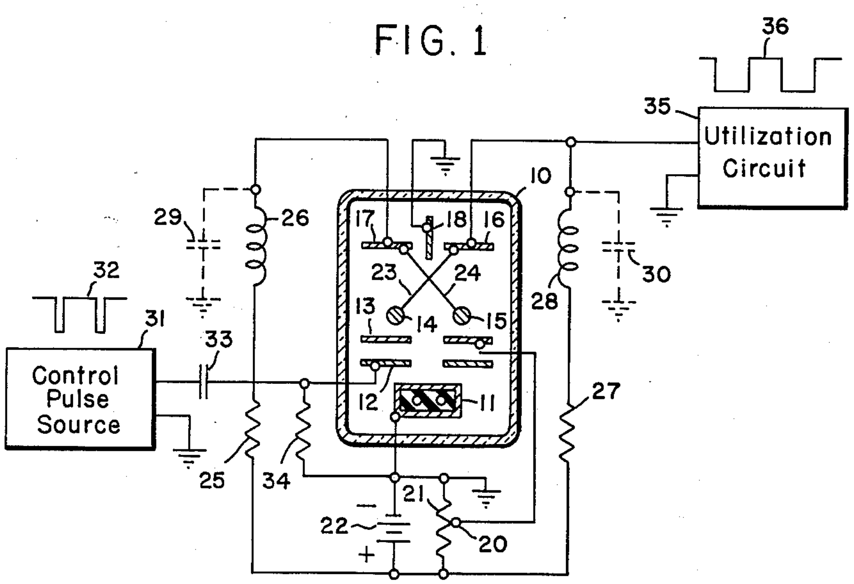
Figure 1 is a schematic circuit diagram of an embodiment of the invention.

In the drawing, a new and improved bistable switching circuit comprises a beam-deflection tube including, within an evacuated envelope 10, a cathode 11, a focusing electrode 12, and an accelerating electrode 13 constituting an electron gun. A pair of electrostatic-deflection electrodes 14 and 15 are disposed on opposite sides of the undeflected path of the beam, and are followed by an anode system comprising a pair of anodes 16 and 17 having active portions on opposite sides of the beam axis. A suppressor vane 18 separates anodes 16 and 17 and suppresses undesirable secondary electron emission in a manner well known in the art. Preferably, all of the electrodes are of substantial length in a direction perpendicular to the plane of the drawing, so that the electron beam projected by the electron gun is sheet-like and of substantially rectangular cross-section, to provide ample beam current comparable to that obtainable with a grid-controlled triode, of the order of 10 milliamperes. All of the electrodes may be mounted in a conventional fashion within envelope 10, after which the tube is evacuated and gettered in a manner well known in the art.

Cathode 11 and suppressor vane 18 are directly connected to ground, while accelerating electrode 13 is connected to a suitable source of positive unidirectional operating potential such as a tap 20 on a resistor 21 connected in parallel with a battery 22 whose negative terminal is grounded. Anodes 16 and 17 are cross-coupled with deflectors 15 and 14 by direct-current conductive means, preferably in the form of galvanic connections by means of wires 23 and 24 and internally of envelope 10. Anode 17 is returned to the positive terminal of battery 22 through a load circuit comprising series-connected resistance and inductance elements 25 and 26, and anode 16 is similarly returned to battery 22 through a load circuit comprising resistance 27 and inductance 28. The two load circuits, when considered in conjunction with distributed circuit capacities 29 and 30 from anodes 17 and 16 respectively to ground, form resonant energy storage devices or parallel resonant circuits, and the inductance, capacity, and resistance values are proportioned to insure less than critical damping in each of the load circuits; in some instances, it may be desirable to connect condensers from the two anodes to ground to augment the distributed capacity, although in most instances the latter is ample to insure operation in the desired manner. The ohmic resistances of elements 25 and 27 are of sufficient value that their sum exceeds the reciprocal of the transconductance of deflection-control system 14, 15 with respect to anode system 16, 17.

In addition to its focusing function, electrode 12 also constitutes an intensity-control electrode which is capable of regulating the amount of beam current projected between deflectors 14 and 15. A source 31 of negative-polarity control pulses, graphically represented at 32, is coupled to intensity-control electrode 12 and to cathode 11 by means of a series condenser 33 and a shunt resistor 34, although equivalent operation may be achieved by impressing positive-polarity control pulses on cathode 11. A utilization circuit, which may comprise either a second bistable switching circuit of the same type with a differentiating input circuit or any other suitable utilization means, is coupled to at least one of the anode load circuits; in the illustrated embodiment, the utilization circuit 35 is coupled to anode 16 and to ground. The waveform of the input signal to utilization circuit 35 is graphically indicated in simplified form at 36 of Figure 1 and in greater detail in Figure 2.

Certain modifications of the tube structure and circuit connections may be made without materially affecting the operation of the circuit. For example, accelerating electrode 13 may be operated at the same or a higher potential than anodes 16 and 17. Alternatively, accelerating electrode 13 may be omitted entirely, with deflectors 14 and 15 furnishing the required accelerating field for the electrons originating at cathode 11. Moreover, it may be advantageous to provide a double-sided construction with similar electrode systems on opposite sides of a centrally disposed cathode having a pair of opposite emissive surfaces. As a still further modification, focusing electrode 12 may be replaced by a conventional intensity-control grid, or such a grid may be interposed between focusing electrode 12 and cathode 11 with focusing electrode 12 operated at a suitable constant potential.

In the absence of control pulses from source 31, intensity-control electrode 12 is normally conditioned to pass beam current by virtue of its return to cathode 11 through resistor 34. If the load circuits are symmetrical, the electron beam projected between deflectors 14 and 15 exhibits no preference between anodes 16 and 17. However, any momentary disturbance or unbalance in the circuit causes the beam to switch to one or the other of the anodes. For purposes of this analysis, it will be assumed that the beam is initially directed to anode 16.

As the preponderance of the beam current is directed to anode 16, its voltage is low relative to that of anode 17. By virtue of cross-connections 23 and 24 between the anodes and the deflectors, this potential unbalance results in the establishment of a transverse deflection field in a direction tending to keep the beam directed toward anode 16. Since the sum of the load circuit resistances exceeds the reciprocal of the transconductance of the deflection-control system with respect to the anode system, the initial operating condition is stabilized so long as beam current is maintained.

Figure 2:
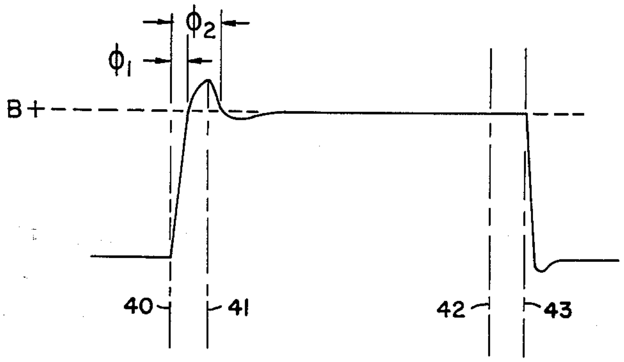
Figure 2 is a detailed graphical representation useful in understanding the operation of the circuit of Figure 1.

When a negative-polarity control pulse of a duration equal to the time interval defined by dash-dot lines 40 and 41 of Figure 2 is applied to intensity-control electrode 12, the flow of beam current is momentarily interrupted. Since load circuit 27, 28, 30 is less-than-critically damped, a transient voltage is induced in the load circuit, and this transient is impressed on deflector 14 by virtue of cross connection 23. The transient causes the potential of anode 16 and deflector 14 to rise above the power supply voltage B+ which is equal to the potential of anode 17 in its non-conductive state. At the instant 41 when the control pulse is removed, the voltage of anode 16 and deflector 14 exceeds that of anode 17 and deflector 15, with the result that the re-established beam encounters a transverse deflection field which directs it to anode 17. Once established, the flow of beam current to anode 17 is stabilized by virtue of the cross-connections from the anodes to the deflectors in the manner outlined above in connection with the stabilization of the initial operating condition.

When the next negative-polarity control pulse, having a duration corresponding to the time interval between dash-dot lines 42 and 43, is impressed on control electrode 12, a transient is developed in the load circuit associated with anode 17, and the beam current is switched back to anode 16 upon removal of the control pulse. The potential of anode 16 remains at B+ until the time represented by line 43, with the result that the voltage wave of Figure 2 is slightly asymmetrical to an extent determined by the width of the control pulse; for many applications, however, including binary counter circuits, this slight asymmetry is wholly immaterial.

Thus, a substantially square-wave output voltage is developed between anode 17 and ground, with the transitions from one voltage level to the other and back occurring in synchronism with the control pulses from source 31. The voltage appearing between anode 16 and ground is of similar waveform, but opposite polarity. Manifestly, utilization circuit 35 may be coupled either to anode 16 or to anode 17, or to both anodes if an output wave of larger amplitude is desired.

The required width of the control pulse (or duration of the switching time) may be determined by well-known principles of circuit analysis. By individually considering each of the elements in the load circuit associated with the conductive anode and applying the principle of linear superposition, it may be shown that the transient phase angle $\phi_1$ defining the minimum switching time is equal to the arc tangent of the reciprocal of the Q or quality factor of the composite load circuit associated with the active anode. For best results, the load circuit Q should be of the order of unity; under this condition, the minimum switching time corresponds to a transient phase angle of about 45°. The maximum switching time is determined by the transient phase angle $\phi_2$ of the next B+ crossover and, for a Q of unity, corresponds to about 225° or a little over one-half of a transient cycle. The optimum switching time corresponds to the phase angle of the transient peak, or slightly more than one-fourth of the transient cycle, although materially shorter switching times may be employed. The optimum switching time is dependent on load circuit Q to a much lesser extent than the minimum and maximum switching times, varying from about 108° for a Q of unity to 90° for a Q of infinity; thus, the optimum switching time falls between one-fourth and one-third of a transient period regardless of load circuit Q. Positive beam switching is assured so long as the beam current is restored at an instant when the potential of the last-conductive anode exceeds the power supply voltage B+.

From the above description, it is apparent that the illustrated circuit is stable in either of two operating conditions, relying on the application of a control pulse to effect a transfer of beam current from one anode to the other. Such circuits find numerous applications in various electrical arts and are particularly useful as binary counting stages in multi-tube computers and the like. Binary counting circuits may also be employed in subscription television systems, as for example in the manner disclosed and claimed in the copending applications of Carl G. Eilers et al., Serial No. 291,714, filed June 4, 1952, for "Subscription Television System," and Alexander Ellett, Serial No. 310,309, filed September 18, 1952, for "Subscriber Television System," both of which are assigned to the present assignee.

A comparison of the disclosed embodiment with conventional double-triode flip-flop circuits reflects several important advantages of the present system. In the first place, since the present circuit employs but a single cathode for each binary counting stage, as compared with a pair of cathodes in a double-triode flip-flop circuit, the likelihood of circuit disability due to cathode failure is cut in half. Moreover, since beam current is continuously drawn from the cathode except during the short intervals of the applied control pulses, the troublesome "sleeping sickness" encountered with double-triode binary counting stages is materially reduced, and tube life is correspondingly increased. As a still further important advantage of the illustrated circuit, it is to be noted that but two resistors and two small coils are employed in place of the five resistors and two condensers required in the conventional flip-flop circuit; in practice, the series-connected resistance and inductance elements in each of the load circuits may be combined in a single wire-wound resistor. Consequently, it is apparent that the illustrated arrangement has the additional advantages of simplicity and economy.

In computer applications, it is frequently desirable to connect a number of binary counting stages in cascade. The illustrated circuit may also be employed in this manner, with the output voltage from each stage being differentiated to provide control pulses for the next succeeding stage. In this connection, it should be noted that the time constant of the differentiating circuits between stages should be comparable to the switching time. Thus, in the circuit of Figure 1, condenser 33 and resistor 34 may be proportioned to provide the control pulses by differentiation of the output voltage from a preceding, similar, switching stage.

The system has been actually constructed and comprehensively tested, with excellent results. Switching times in the order of one-tenth of a microsecond or less are quite feasible; for such rapid switching, the differentiating condenser between successive stages is very small, of the order of a few micro-microfarads. Beam currents of eight or ten milliamperes with a deflection-control system transconductance of 250 micromhos are readily obtainable, for which plate load resistors of from five thousand to ten thousand ohms each may be employed. The load inductances may be of the order of 400 microhenries each.

While a particular embodiment of the present invention has been shown and described, it is apparent that various changes and modifications may be made, and it is therefore contemplated in the appended claims to cover all such changes and modifications as fall within the true spirit and scope of the invention.

I claim:

1. A bistable switching circuit comprising: a beam deflection tube comprising a cathode for projecting an electron beam along a predetermined axis, a deflection-control system including a pair of electrostatic-deflection electrodes flanking said axis, an anode system comprising first and second anodes having active portions on opposite sides of said axis, and an intensity-control electrode interposed between said cathode and said electrostatic-deflection electrodes, said deflection-control system having a predetermined transconductance with respect to said anode system; direct-current conductive means cross-coupling said anodes and said electrostatic-deflection electrodes; means normally conditioning said intensity-control electrode to pass beam current; first and second load circuits coupled to said first and second anodes respectively and to said cathode and including respective resonant energy storage devices and respective series resistance elements to produce damping in said storage devices, the sum of said resistances exceeding the reciprocal of said predetermined transconductance, whereby said beam current is continuously directed to one of said anodes; means for applying negative pulses to said intensity-control electrode to interrupt said beam current momentarily and induce a transient in the load circuit associated with said one anode, whereby the beam is transferred to the other of said anodes; said damping to be less-than-critical but sufficient to cause said beam to be transferred only once in response to each of said negative pulses; and utilization means coupled to at least one of said load circuits.

2. A bistable switching circuit comprising: a beam deflection tube comprising a cathode for projecting an electron beam along a predetermined axis, a deflection-control system including a pair of electrostatic-deflection electrodes flanking said axis, an anode system comprising first and second anodes having active portions on opposite sides of said axis, and an intensity-control electrode interposed between said cathode and said electrostatic-deflection electrodes, said deflection-control system having a predetermined transconductance with respect to said anode system; galvanic cross-connections between said anodes and said electrostatic-deflection electrodes; means normally conditioning said intensity-control electrode to pass beam current; first and second load circuits coupled to said first and second anodes respectively and to said cathode and including respective resonant energy storage devices and respective series resistance elements to produce damping in said devices, the sum of said resistances exceeding the reciprocal of said predetermined transconductance, whereby said beam current is continuously directed to one of said anodes; means for applying negative pulses to said intensity-control electrode to interrupt said beam current momentarily and induce a transient in the load circuit associated with said one anode, whereby the beam is transferred to the other of said anodes; said damping to be less-than-critical but sufficient to cause said beam to be transferred only once in response to each of said negative pulses; and utilization means coupled to at least one of said load circuits.

3. A bistable switching circuit comprising: a beam deflection tube comprising a cathode for projecting an electron beam along a predetermined axis, a deflection-control system including a pair of electrostatic-deflection electrodes flanking said axis, an anode system comprising first and second anodes having active portions on opposite sides of said axis, and an intensity-control electrode interposed between said cathode and said electrostatic-deflection electrodes, said deflection-control system having a predetermined transconductance with respect to said anode system; direct-current conductive means cross-coupling said anodes and said electrostatic-deflection electrodes; means normally conditioning said intensity-control electrode to pass beam current; first and second load circuits coupled to said first and second anodes respectively and to said cathode and individually comprising inductance elements and series-connected resistance elements to produce damping in said storage load circuits, the sum of said resistances exceeding the reciprocal of said predetermined transconductance, whereby said beam current is continuously directed to one of said anodes; means for applying negative pulses to said intensity-control electrode to interrupt said beam current momentarily and induce a transient in the load circuit associated with said one anode, whereby the beam is transferred to the other of said anodes; said damping to be less-than-critical but sufficient to cause said beam to be transferred only once in response to each of said negative pulses; and utilization means coupled to at least one of said load circuits.

4. A bistable switching circuit comprising: a beam deflection tube comprising a cathode for projecting an electron beam along a predetermined axis, a deflection-control system including a pair of electrostatic-deflection electrodes flanking said axis; an anode system comprising first and second anodes having active portions on opposite sides of said axis, and an intensity-control electrode interposed between said cathode and said electrostatic-deflection electrodes, said deflection-control system having a predetermined transconductance with respect to said anode system; direct-current conductive means cross-coupling said anodes and said electrostatic-deflection electrodes; means normally conditioning said intensity-control electrode to pass beam current; first and second load circuits coupled to said first and second anodes respectively and to said cathode and including respective resonant energy storage devices and respective series resistance elements to produce damping in said devices, the sum of said resistances exceeding the reciprocal of said predetermined transconductance, whereby said beam current is continuously directed to one of said anodes, and each of said load circuits having a predetermined quality factor; a source of negative polarity control pulses coupled to said intensity control electrode to interrupt said beam momentarily and induce a transient in the load circuit associated with said one anode, said control pulses individually having a duration corresponding to a phase angle of said transient greater than the arc tangent of the reciprocal of said quality factor, whereby the beam is transferred to the other of said anodes; said damping to be less-than-critical but sufficient to cause said beam to be transferred only once in response to each of the said negative pulses and utilization means coupled to at least one of said load circuits.

5. A bistable switching circuit comprising: a beam deflection tube comprising a cathode for projecting an electron beam along a predetermined axis, a deflection-control system including a pair of electrostatic-deflection electrodes flanking said axis, an anode system comprising first and second anodes having active portions on opposite sides of said axis, and an intensity-control electrode interposed between said cathode and said electrostatic-deflection electrodes, said deflection-control system having a predetermined transconductance with respect to said anode system; direct-current conductive means cross-coupling said anodes and said electrostatic-deflection electrodes; means normally conditioning said intensity-control electrode to pass beam current; first and second load circuits coupled to said first and second anodes respectively and to said cathode and including respective resonant energy storage devices less-than-critically damped by respective series resistance elements, the sum of said resistances exceeding the reciprocal of said predetermined transconductance, whereby said beam current is continuously directed to one of said anodes, and each of said load circuits having a quality factor substantially equal to unity; a source of negative polarity control pulses coupled to said intensity control electrode to interrupt said beam momentarily and induce a transient in the load circuit associated with said one anode, said control pulses individually having a duration corresponding to a phase angle of said transient greater than the arc tangent of the reciprocal of said quality factor, whereby the beam is transferred to the other of said anodes; and utilization means coupled to at least one of said load circuits.

6. A bistable switching circuit comprising: a beam deflection tube comprising a cathode for projecting an electron beam along a predetermined axis, a deflection-control system including a pair of electrostatic-deflection electrodes flanking said axis, an anode system comprising first and second anodes having active portions on opposite sides of said axis, and an intensity-control electrode interposed between said cathode and said electrostatic-deflection electrodes, said deflection-control system having a predetermined transconductance with respect to said anode system; direct-current conductive means cross-coupling said anodes and said electrostatic-deflection electrodes; means normally conditioning said intensity-control electrode to pass beam current; first and second load circuits coupled to said first and second anodes respectively and to said cathode and including respective resonant energy storage devices and respective series resistance elements to produce damping in said devices, the sum of said resistances exceeding the reciprocal of said predetermined transconductance, whereby said beam current is continuously directed to one of said anodes, and each of said load circuits having a predetermined quality factor; a source of negative polarity control pulses coupled to said intensity control electrode to interrupt said beam momentarily and induce a transient in the load circuit associated with said one anode, said control pulses individually having a duration of from one-fourth to one-third of a period of said transient, whereby the beam is transferred to the other of said anodes; said damping to be less-than-critical but sufficient to cause said beam to be transferred only once in response to each of said negative pulses; and utilization means coupled to at least one of said load circuits.

7. A bistable switching circuit comprising: a beam deflection tube comprising a cathode for projecting an electron beam along a predetermined axis, a deflection-control system including a pair of electrostatic-deflection electrodes flanking said axis, an anode system comprising first and second anodes having active portions on opposite sides of said axis, and an intensity-control electrode interposed between said cathode and said electrostatic-deflection electrodes, said deflection-control system having a predetermined transconductance with respect to said anode system; direct-current conductive means cross-coupling said anodes and said electrostatic-deflection electrodes; means normally conditioning said intensity-control electrode to pass beam current; first and second load circuits coupled to said first and second anodes respectively and to said cathode and including respective series resistance elements to produce damping in said load circuits, the sum of said resistances exceeding the reciprocal of said predetermined transconductance, whereby said beam current is continuously directed to one of said anodes; means for applying negative pulses to said intensity-control electrode to interrupt said beam current momentarily and induce a transient in the load circuit associated with said one anode, whereby the beam is transferred to the other of said anodes; said damping to be less-than-critical but sufficient to cause said beam to be transferred only once in response to each of said negative pulses; and utilization means coupled to at least one of said load circuits.

References Cited in the file of this patent

UNITED STATES PATENTS

| | | |
|---|---|---|
| 2,154,127 | Hollmann | Apr. 11, 1939 |
| 2,185,135 | Schlesinger | Dec. 26, 1939 |
| 2,332,977 | Skellett | Oct. 26, 1943 |
| 2,489,329 | Selgin | Nov. 29, 1949 |